United States Patent [19]
Keller et al.

[11] Patent Number: 6,087,984
[45] Date of Patent: *Jul. 11, 2000

[54] GPS GUIDANCE SYSTEM FOR USE WITH CIRCULAR CULTIVATED AGRICULTURAL FIELDS

[75] Inventors: Russell J. Keller; Arthur F. Lange, both of Sunnyvale, Calif.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/073,072

[22] Filed: May 4, 1998

[51] Int. Cl.[7] .............................. H04B 7/185; G01S 5/02
[52] U.S. Cl. ..................................................... 342/357.17
[58] Field of Search .............................. 342/357, 357.06, 342/357.17; 701/213, 215, 224

[56] References Cited

U.S. PATENT DOCUMENTS

| | | |
|---|---|---|
| 4,398,195 | 8/1983 | Dano . |
| 5,214,281 | 5/1993 | Rowe ........................................ 250/253 |
| 5,334,987 | 8/1994 | Teach ........................................ 342/357 |
| 5,704,546 | 1/1998 | Henderson et al. ........................ 239/1 |
| 5,717,593 | 2/1998 | Gvili . |

Primary Examiner—Theodore M. Blum
Attorney, Agent, or Firm—Wagner Murabito & Hao LLP

[57] ABSTRACT

A GPS (Global Positioning System) aircraft guidance system for use with circular cultivated agriculture fields. The system of the present invention includes a GPS receiver adapted to determine a present position, ground track, and ground speed of an aircraft. The GPS receiver is also adapted to store a configuration of a circular cultivated agricultural field and to compute a desired flight path for achieving an optimal coverage of the field. Deviations of the aircraft from the desired flight path are also determined. The GPS receiver is further adapted to generate a dispense signal which indicates when to dispense agricultural chemicals from the aircraft. A guidance indicator is coupled to the GPS receiver for providing guidance information to the pilot. The guidance indicator is adapted to indicate the aircraft's deviation from the desired flight path and indicate whether the dispense signal is asserted. This information aids the pilot in maintaining the desired flight path and achieving the optimal coverage of the circular cultivated agricultural field.

29 Claims, 14 Drawing Sheets

6,087,984

GPS GUIDANCE SYSTEM FOR USE WITH CIRCULAR CULTIVATED AGRICULTURAL FIELDS

TECHNICAL FIELD

The present invention relates generally to the dispensing of chemicals to agricultural fields by aircraft. More specifically, the present invention pertains to a high accuracy GPS (Global Positioning System) based method and system for efficiently dispensing chemicals to agricultural fields.

BACKGROUND ART

Modern agriculture, particularly in more arid regions, is increasingly turning to the use of circular cultivation and irrigation techniques for increased yields and farming efficiency. Circular cultivation involves the use an a long boom which rotates radially around a central pivot. The boom is supported above the ground by pylons. The bottom ends of the pylons are connected to wheels while the upper ends support the boom. The boom functions by irrigating the crops with water received via the central pivot as it rotates radially on the connected wheels. This is a very efficient way of irrigating large areas of land. As the boom swings around the central pivot in a controlled fashion, predetermined amounts of water are dispensed. The process lends itself readily to automation. Large areas of agricultural land can be efficiently farmed using this process. The efficiency of the process has made it very popular, as evidenced by the distinctive circular patterns of cultivated farmland frequently observed by air travelers in the American Mid-west.

While circular cultivation has proven very efficient in some aspects (e.g., irrigation), the resulting distinctive circular patterns of crops, commonly referred to as "crop-circles", are more difficult to manage in other aspects. This is especially true in the case of crop-dusting.

Crop-dusting is the term generally used for the dispensing of chemicals (e.g., fertilizers, pesticides, and the like) to an agricultural field (e.g., field crops, orchards, etc.) from an aircraft. During crop-dusting, the dispensing aircraft makes numerous sequential, adjacent passes, dispensing chemicals in a swath across the field in each pass. The aircraft's pilot carefully follows a flight path which ensures that each successive swath over the field is correctly spaced, distance wise, from the previous swath in order to avoid gaps or overlaps in coverage. For example, should one swath occur too far from a previous swath, the area of the field will not receive an sufficient amount of chemicals (e.g., pesticides, fertilizer, herbicides, and the like). Similarly, should one swath occur too close to a previous swath, the overlap area receives excessive amounts of chemicals. This can prove very expensive to the farmer. The crops of the field can be damaged or rendered unusable.

The circular pattern of the crops circles makes aircraft crop-dusting operations more difficult. Conventional, rectangular, agriculture fields, having neatly ordered rows of crops laid out in a rectangular pattern, readily lend themselves to the orderly, rank and file, back and forth maneuvers of a crop-dusting aircraft. Typically, the pilot guides the crop dusting aircraft up and down the rectangular field parallel to its rows, keeping track of progress by counting the rows covered. The physical layout of conventional, rectangular agriculture fields aid the pilot in making sure that the agricultural field is covered evenly. With crop circles however, it is more difficult for the pilot to keep track of his location and of what portion of the field is done. To enhance the efficiency of the crop dusting process, several navigation aids (navaids) using sophisticated guidance and positioning techniques, including GPS have been developed.

For example, US Patent number 4,225,226 issued to Davidson, et al., discloses a laser guidance system for crop dusting aircraft. U.S. Pat. No. 5,334,987 issued to Teach discloses a GPS based system for continuously tracking aircraft location and for automatically dispensing chemicals based upon the aircraft's GPS determined position with respect to the agricultural field. There is a problem, however, in that while these solutions are effective with rectangular agriculture fields, they are less efficient with crop circles. Each of the above prior art solutions were developed for use with the more prevalent conventional, rectangular fields. These conventional GPS crop dusting aids are designed to function with rectangular, rank and file, row by row, form of agricultural fields. In the case of crop circles, there are no neatly laid out, parallel rows. There are no equal length files of crops. The rows, if any, are circular and concentric, following the pattern traced out by the boom as it rotates around the central pivot. As such, the usual guidance cues of the rectangular agriculture fields are missing.

Several techniques have been attempted to adapt the above prior art solutions to use with crop circles. These techniques include, for example, cross flying. Cross flying involves the use of a navigation reference baseline external to the crop-circle. The use of the reference baseline allows the prior art navaids to model the crop circle as if it where a conventional rectangular field. The crop circle is then cross-flown, where the aircraft flies parallel swaths in one direction, rastering across the field, and subsequently flies parallel swaths in an orthogonal direction, to ensure coverage. Hence, much of the crop circle is over-flown twice or more. This has a number of undesirable consequences (e.g., increases flight time, materials, and costs).

For example, multiple over-flights potentially leads to over-dispensing of chemicals. The chemicals can be very expensive. In addition, as described above, over coverage can have detrimental effects on the crops. Another undesirable consequence is the fact that the aircraft unavoidably flies through the lingering aerosol clouds of its own spray. Depending upon the chemicals being dispensed, this can be extremely undesirable. The chemicals may be very harmful to the aircraft and to the pilot. Also, repeated over-flights disturbs the spray aerosol of the swaths, not allowing the aerosol clouds of the swaths to settle slowly and evenly onto the crops below.

Thus, what is needed is a method and system which specifically accounts for the form factor of a crop circle. What is needed is a system which gives the pilot a precise point of entry onto the crop circle, and which positions the point of entry such that the pilot has an unmistakable visual reference. What is needed is a system which provides accurate guidance commands such that the entire crop circle can be covered without any gaps or overlaps, and without requiring the crop dusting aircraft to fly through its own spray. What is needed is a system which makes efficient use of flight time, covering the crop circle in a minimum amount of time. The present invention provides a novel solution to the above needs.

DISCLOSURE OF THE INVENTION

The present invention provides a method and system which specifically accounts for the form factor of a crop circle. The system of the present invention gives the pilot of a crop-dusting aircraft a precise point of entry onto the crop circle, and which positions the point of entry such that the pilot has an unmistakable visual reference (e.g., the center pivot of the crop circle). The system of the present invention provides accurate guidance such that the entire crop circle can be covered without any gaps or overlaps, and without requiring the crop dusting aircraft to fly through its own spray. In addition, the system of the present invention makes efficient use of aircraft flight time by covering the crop circle in a minimum amount of time.

In one embodiment, the system of the present invention includes a GPS receiver (or alternatively, a differential GPS receiver) adapted to determine a present position, ground track, and ground speed of an aircraft. The GPS receiver is also adapted to store a configuration (e.g., the GPS coordinates) of a circular cultivated agricultural field and to compute a desired flight path for achieving an optimal coverage of the field. Deviations of the aircraft from the desired flight path are also determined. The GPS receiver is further adapted to generate a dispense signal which indicates when to dispense agricultural chemicals from the aircraft. A guidance indicator (e.g., a course deviation indicator) is coupled to the GPS receiver for providing guidance information to the pilot. The guidance indicator is adapted to indicate the aircraft's deviation from or direction to the desired flight path and indicate whether the dispense signal is asserted. This information aids the pilot in maintaining the desired flight path and achieving the optimal coverage of the circular cultivated agricultural field.

The GPS receiver is adapted to automatically determine the configuration of the circular cultivated agricultural field by receiving an entry signal from the pilot (e.g., pressing a button) when the aircraft crosses an entry point of the field and by receiving a exit signal from the pilot when the aircraft crosses an exit point of the field. In agricultural aircraft terminology, this is referred to as creating an (A) "start point" (B) "end point" line, or a "baseline". The pilot flies a straight course across a center point of the field from the entry point to the exit point, thereby defining an initial swath.

This defines the diameter of the particular crop circle and its parts (e.g., boundaries, dimensions, and the like) in GPS coordinates. From this information, everything which needed to compute the optimum flight path for the particular crop circle is known. An algorithm immediately defines the GPS coordinates for the boundaries of the crop circle. This comprises determining the configuration of the crop circle. The algorithm also calculates the lengths of successive swaths (e.g., chords) which are each parallel to the initial swath. Determining the swath paths to follow based upon the initial swath comprises determining the desired flight path for the particular crop circle. Hence, the first and second signals enable the automatic computing of the crop circles configuration, which in turn, enables the determination of the optimal desired flight path.

The pilot subsequently guides the aircraft along the desired flight path and dispenses the agricultural chemicals according to the dispense signal, laying down a series of parallel swaths of chemicals across the field, without gapping or overlapping the swaths. In so doing, the system of the present invention makes efficient use of flight time and agricultural chemicals, efficiently covering the crop circle in a minimum amount of time.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to obscure aspects of the present invention unnecessarily.

The present invention provides a method and system which specifically accounts for the form factor of a crop circle. The system of the present invention gives the pilot of a crop-dusting aircraft a precise point of entry onto the crop circle, and which positions the point of entry such that the pilot has an unmistakable visual reference (e.g., the center pivot of the crop circle). The system of the present invention provides accurate guidance commands such that the entire crop circle can be covered without any gaps or overlaps, and without requiring the crop dusting aircraft to fly through its own spray. In addition, the system of the present invention makes efficient use of aircraft flight time by covering the crop circle in a minimum amount of time.

Although in the embodiments disclosed herein, the present invention is described functioning with circular cultivated agricultural fields, it should be appreciated that the present invention is suited to use with various non-rectangular cultivated agricultural fields such as, for example, semi-circular, oval, elliptical, or other such agricultural fields. The present invention and its benefits are further described below.

Figure 1:
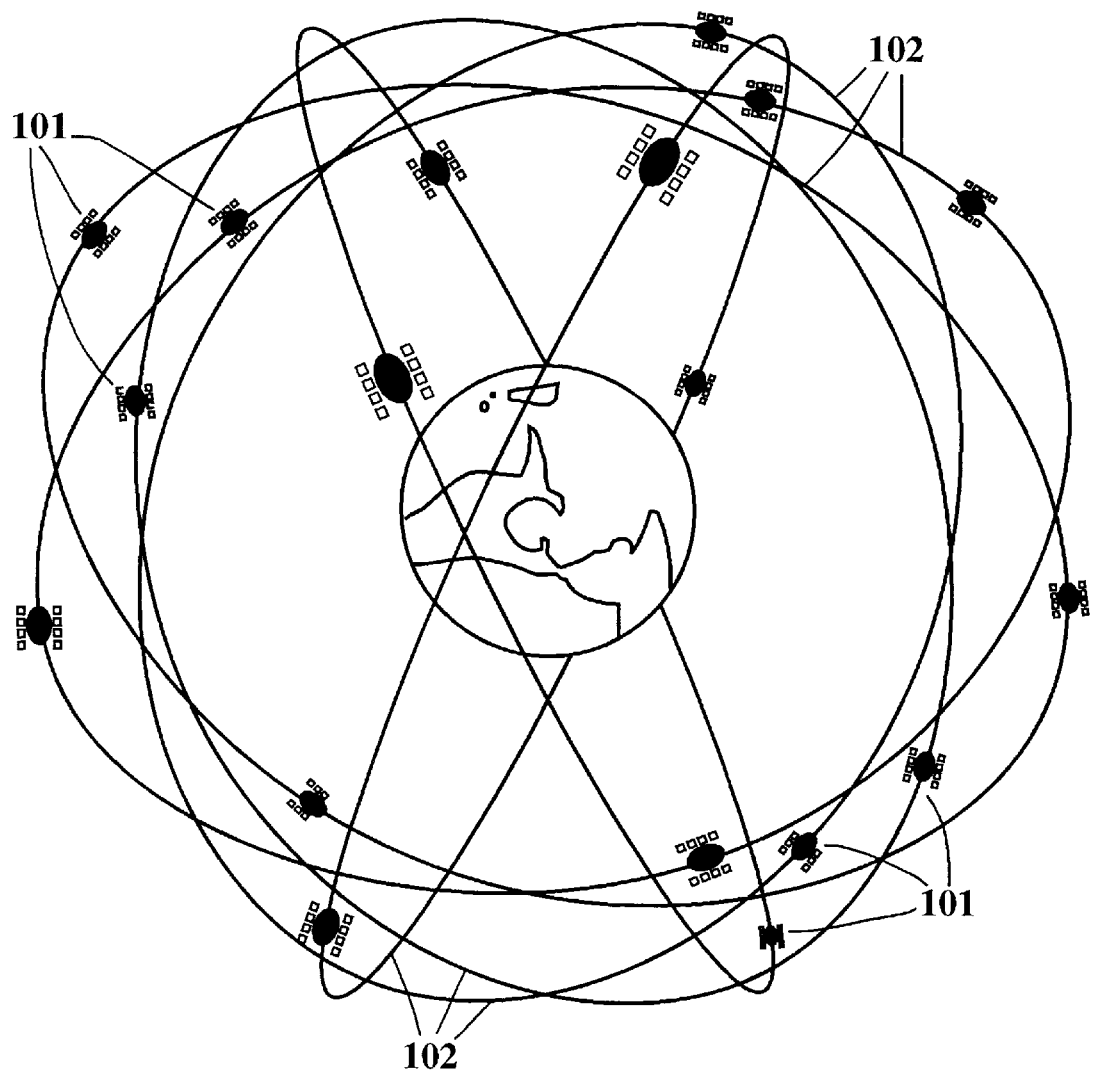
FIG. 1 shows a constellation of GPS satellites in orbit.

FIG. 1 shows a constellation 100 of GPS satellites 101 in orbit. As described above, the system of the present invention uses GPS satellites 101 for navigation and positioning information. GPS satellites 101 are located in six orbital planes 102 with four of the GPS satellites 101 in each plane, plus a number of "on orbit" spare satellites (not shown) for redundancy. The GPS satellites 101 are located in orbital planes, having an inclination of 55 degrees relative to the equator and an altitude of approximately 20,200 km (10,900 miles), and typically complete an orbit in approximately 12 hours. This positions each of the GPS satellites 101 in such a manner that a minimum of five of the GPS satellites 101 are normally observable (above the horizon) by a user anywhere on earth at any given time.

The orbiting GPS satellites 101 each broadcasts spread-spectrum microwave signals encoded with positioning data. The signals are broadcast on two frequencies, L1 at 1575.42 MHz and L2 at 1227.60 MHz, with the satellite ephemeris (positioning data in an earth-centered, earth-fixed coordinate system) modulated using bi-phase shift keying techniques. Essentially, the signals are broadcast at precisely known times and at precisely known intervals and are encoded with their precise time of transmission. A user receives the signals with a GPS receiver (e.g., GPS receiver 203 of FIG. 2) designed to determine an exact time of arrival of the signals and to demodulate the satellite orbital data contained therein. Using the orbital data, the GPS receiver determines the time between transmission by the satellite and reception by the receiver. Multiplying this time by the speed of light gives what is termed as the pseudo-range measurement of that satellite. By determining the pseudo-ranges of four or more satellites, the GPS receiver is able to determine its location in three dimensions, as well as a time offset which is used to generate a very precise time reference. Thus, a user equipped with a proper GPS receiver is able to determine his PVT (position, velocity, and time) with great accuracy, and use this information for very precise navigation, among other applications.

To improve the accuracy of GPS determined PVT, differential GPS systems have been developed and widely deployed. As is well known, differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the users to increase the accuracy of their GPS determined position. Differential correction broadcasts are currently in wide use throughout the world. Tens of thousands of DGPS receivers have been built and are in operation.

An even more accurate technique for improving the accuracy of GPS is RTK (real-time kinematics). As is well known, RTK involves the use of two or more GPS receivers which are coupled via a communications link (usually RF based). The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters). Thus, RTK GPS receivers are among the most accurate navigation and surveying instruments available. RTK and related areas of art are further described in U.S. Pat. No. 5,519,620 issued to Talbot et al., and U.S. Pat. No. 5,359,332 issued to Allison et al., which are both incorporated herein.

Thus, in the following discussions, the present invention is described using conventional GPS receivers to avoid unnecessarily obscuring aspects of the present invention. However, it should be noted that the system of the present invention is well suited to operation with either conventional GPS, the more accurate, yet more complex, DGPS receivers, or the extremely accurate RTK GPS receivers.

Figure 2:
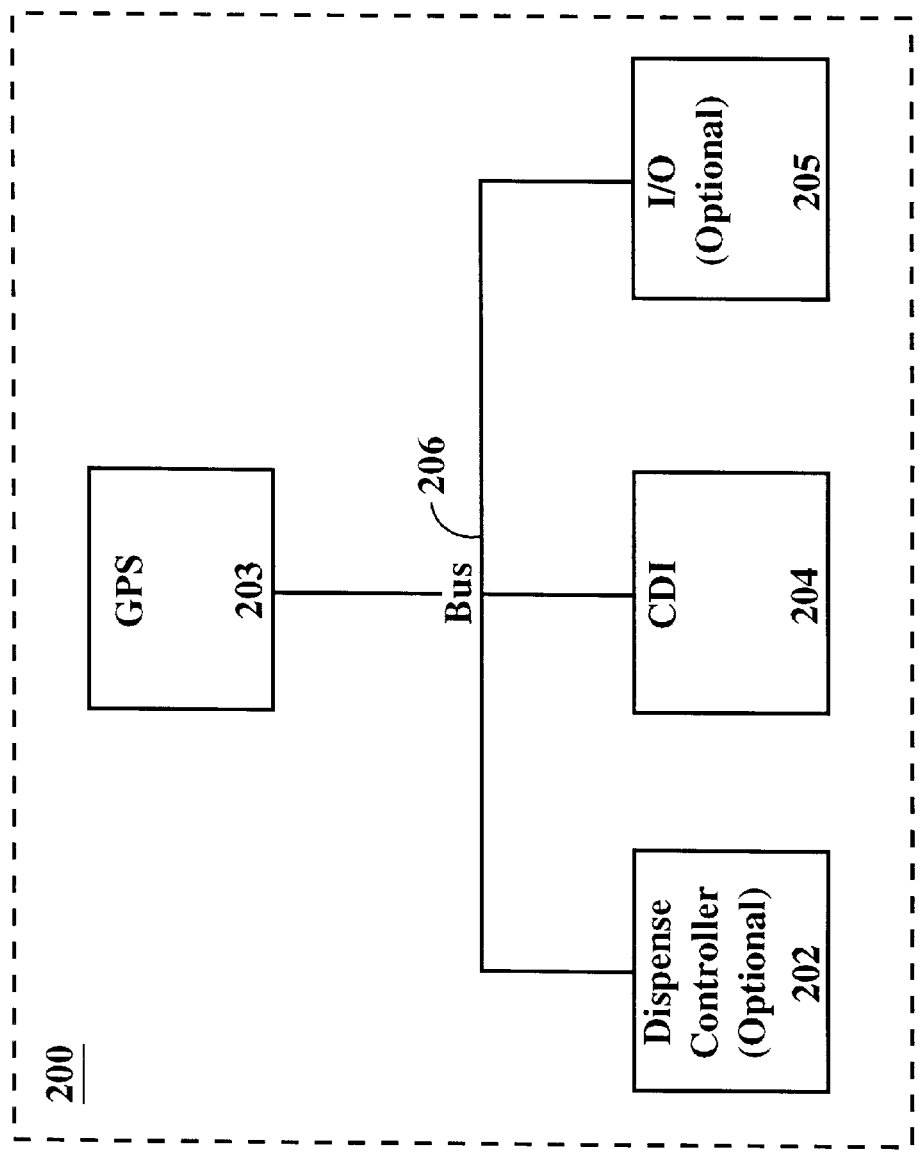
FIG. 2 is a block diagram of a system in accordance with one embodiment of the present invention.

FIG. 2 shows a system 200 in accordance with one embodiment of the present invention. System 200 includes a GPS receiver (or alternatively, a differential GPS receiver) 203, a CDI 204 (course deviation indicator), a dispense controller 202, and an input output unit (I/O) 205, each coupled to a bus 206. Dispense controller 202, and I/O unit 205 are optional components. In the present embodiment, GPS receiver 203 provides positioning information and navigation data to CDI 204, which in turn, generates and displays guidance information to the pilot (e.g., of an aircraft in which system 200 is installed).

Figure 5:
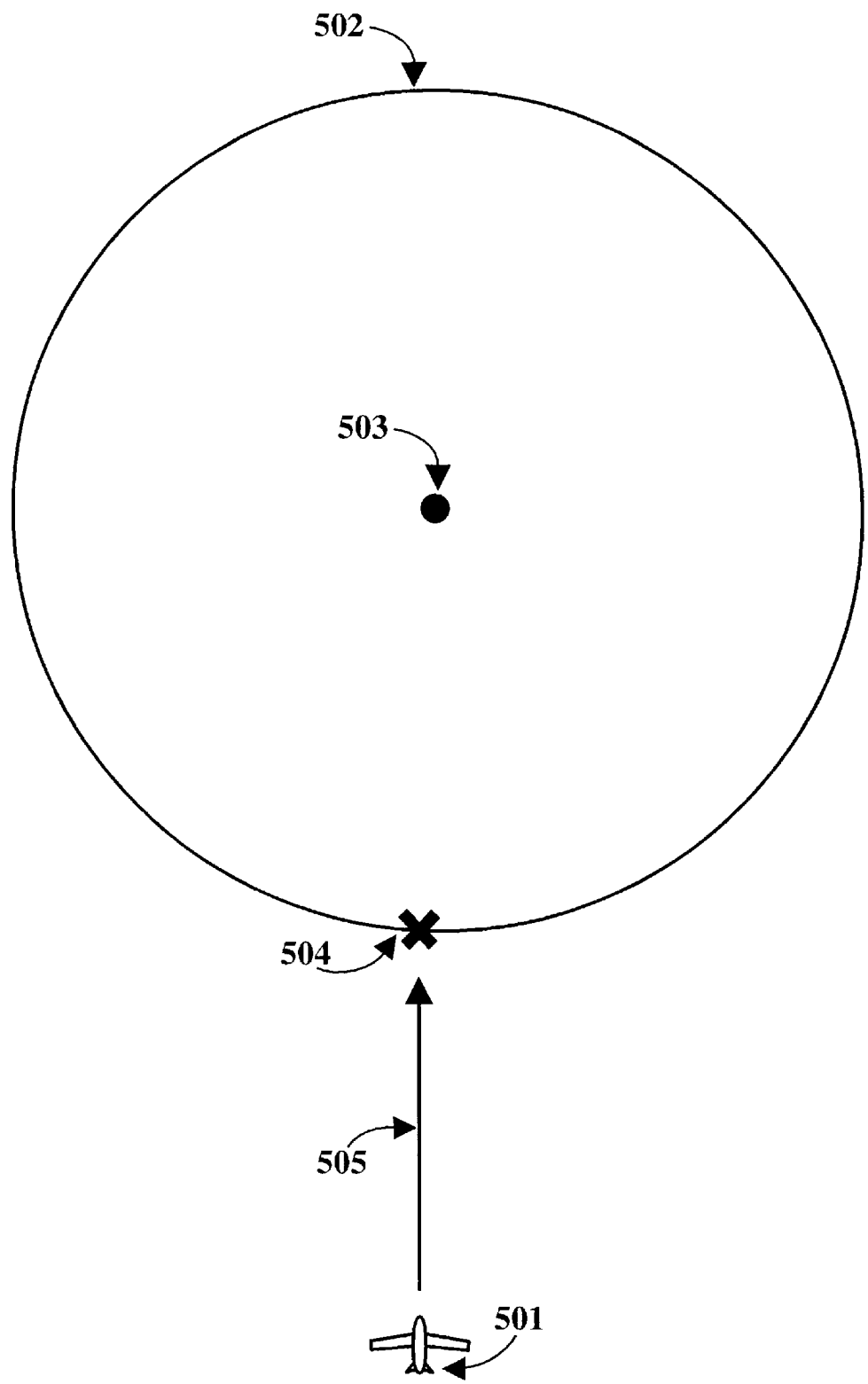
FIG. 5 shows a diagram of an aircraft of the present invention approaching a crop circle.

In the present embodiment, GPS receiver 203 functions by determining a present position, ground track, and ground speed of an aircraft in which system 200 is installed (e.g., aircraft 501 of FIG. 5). GPS receiver 203 contains sufficient computational resources to execute various software routines which implement the functionality of the present invention. Accordingly, GPS receiver 203 is adapted to determine and store the configuration of a circular cultivated agricultural field (referred to hereinafter as a crop circle) and compute a desired flight path for achieving an optimal coverage of the crop circle. Once the desired flight path is computed, GPS receiver 203 tracks the present position of the aircraft and computes deviations of the aircraft, if any, from the desired flight path.

CDI 204 functions as a guidance indicator for a pilot of the aircraft. CDI 204 displays the desired flight path and any deviations therefrom to the pilot. By following the indicators of CDI 204, the pilot is able to guide the aircraft along the desired flight path, thereby obtaining optimal coverage. Deviations from the desired flight path are indicated, allowing the pilot to make corresponding course corrections. In the present embodiment, CDI 204 is further adapted to indicate whether the dispense signal is asserted. This provides an additional means of detecting whether the agricultural chemicals are being sprayed at the proper time. For example, the dispense signal indicator can be cross checked by the pilot to ensure that chemicals are being sprayed when the aircraft crosses the boundary of the crop circle at the beginning of a swath, and that the spraying stops when exiting the crop circle at the end of the swath.

The optional dispense controller 202 provides for the automatic dispensing of agricultural chemicals in accordance with commands (e.g., a dispense signal) from GPS receiver 203. As described above, in the present embodiment, GPS receiver 203 is adapted to determine and store the configuration and dimensions of a target crop circle. GPS receiver 203 is also adapted to determine the desired flight path and deviations therefrom. Consequently, GPS receiver 203 has the necessary information to control the dispensing of chemicals at the required locations and at the required times for achieving the optimal coverage of the target crop circle. For example, as discussed in greater detail below, when the aircraft flies a swath of the crop circle, GPS receiver 203 asserts a dispense signal to dispense controller 202 via bus 206 to commence dispensing chemicals as the aircraft enters the crop circle. The dispense signal is deasserted when the aircraft exits the crop circle, shutting off the chemicals. This process is repeated for each swath, as the aircraft is guided along the desired flight path by the pilot, thereby efficiently covering the crop circle. For example, GPS velocity can aid in flow control, wherein the rate at which the chemicals are dispensed is controlled. The faster or slower the aircraft flies a swath (e.g., ground speed), the higher or lower the flow rate of chemicals.

The optional I/O component 205 functions by providing for connectivity of system 200 with any external navigation electronics or other devices. In the present embodiment, I/O 205 is a removable storage device for uploading and downloading information to and from system 200 via removable magnetic media (e.g., floppy disks, removable hard disks, flash memory cards, etc.). However, I/O 205 could alternatively be a port (e.g., RS-232, USB, IEEE1394, etc.) for coupling to other navigation instruments, or some other device providing a means of inputting and outputting information to and from system 200.

Bus 206 functions by communicatively coupling the components of system 200 together. The components communicate electronically via bus 206, using an appropriate bus protocol (e.g., USB, MilStd 1552, or the like). Additional optional components are added to system 200 by coupling them to bus 206. As needed by the particular requirements of the user, the operating software of system 200 can be modified to take advantage of the added components. In this manner, bus 206 provides a means of extending the functionality of system 200 as the requirements of the user change.

Figure 3A:
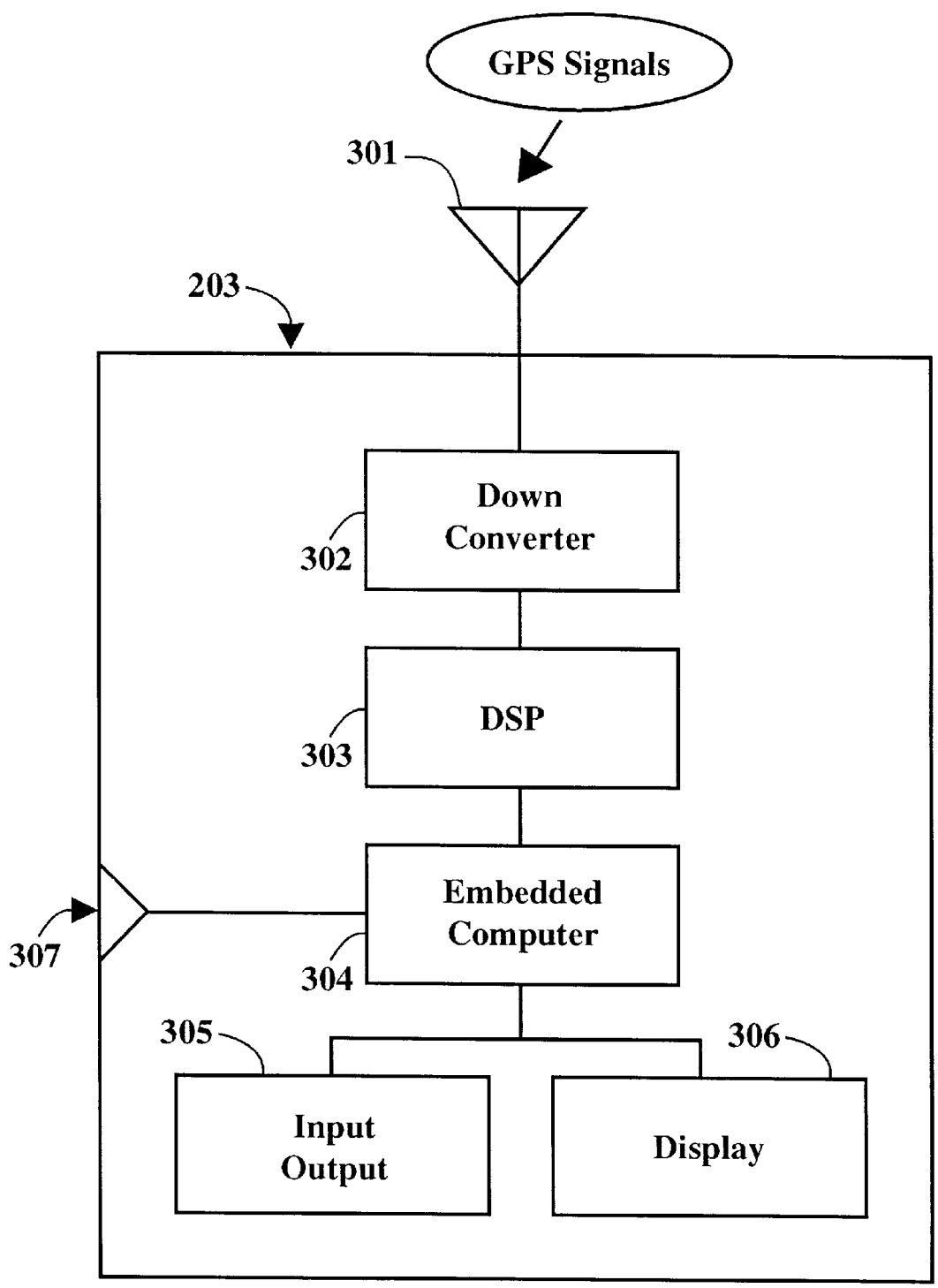
FIG. 3A shows a GPS receiver in accordance with one embodiment of the present invention.

Referring now to FIG. 3A, a GPS receiver 203 in accordance with one embodiment of the present invention is shown. GPS receiver 203 is designed to function with GPS satellites 101 of FIG. 1. GPS receiver 203 receives GPS signals from GPS constellation 100 via antenna 301. The GPS signals are down converted, via down converter 302, then de-spread and demodulated by the digital signal processor (DSP) 303, and passed to an internal embedded computer 304, which computes the correct pseudo ranges and determines the GPS-based position. Information can be communicated to the user via an optional display coupled to the embedded computer and built into GPS receiver 203. In the present embodiment, display 306 and CDI 204 (of FIG. 2) are both adapted to present position and navigation information to the pilot.

The GPS receiver 203 can be configured via an optional user input output 305 (e.g., a keyboard or joystick). Accordingly, GPS receiver 203 can receive navigation information or the like via input output 305 or via I/O component 205 and bus 206 (of FIG. 2). The GPS-based position and other navigation information are communicated to system 200 via communications port 307. Communications port 307 couples GPS receiver 203 to bus 206. Additionally, communications port 307 can be one of many well known interface standards in use in the electronics field (e.g., RS-232, ARINC 429, ARINC 629, Milstd 1553, and the like).

Figure 3B:
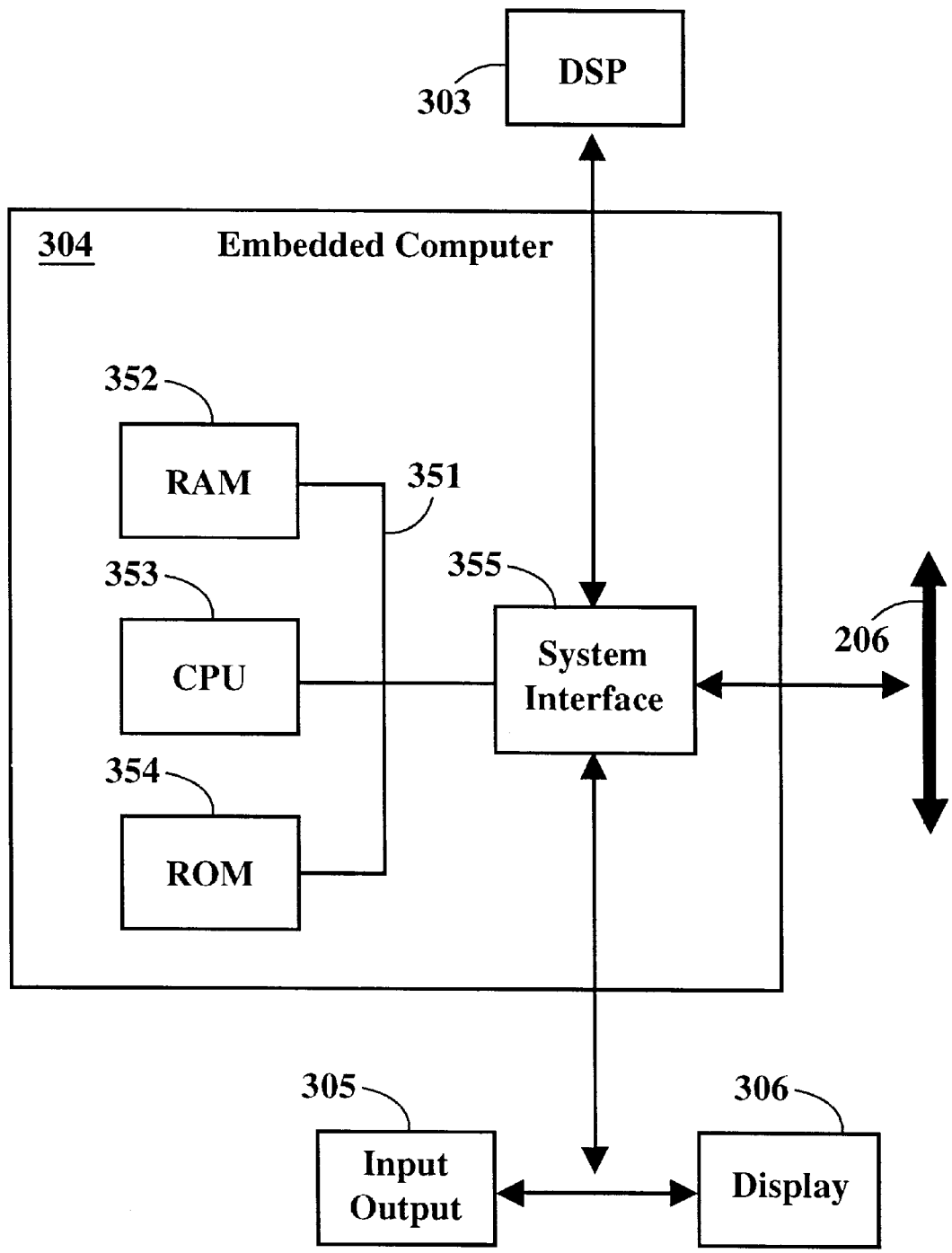
FIG. 3B shows a more detailed diagram of the embedded computer of the GPS receiver of FIG. 3A.

FIG. 3B shows a more detailed diagram of embedded computer 304 of FIG. 3A. As described above, GPS receiver 203 includes sufficient computational resources to host software programs which implement many features and functions of the present invention. In the present embodiment, this software is executed on the computer system platform provided by embedded computer 304. The software interacts with the other components of system 200 of FIG. 2 via message passing and communication protocols of port 307 and bus 206. Specifically, it should be appreciated that aspects of the present invention, described herein, are discussed in terms of functions or steps executed on a computer system platform. Although a variety of different computer systems can be used with the present invention, an exemplary general purpose computer system is shown in the embedded computer 304 of FIG. 3B. It should further be appreciated that alternatively, any other one or more components of system 200 (e.g., CDI 204) can include the necessary computational resources and thereby provide a computer system platform for executing the software of the present invention.

With reference still to FIG. 3B, embedded computer 304 includes an address/data bus 351 for communicating information, one or more central processors (CPUs) 353 coupled with the bus 351 for processing information and instructions, a volatile memory (e.g., random access memory RAM) 352 coupled with the bus 351 for storing information and instructions for the CPU 353, and a non-volatile memory (e.g., read only memory ROM) 354 coupled with the bus 351 for storing static information and instructions for the CPU 353. Also included in the embedded computer 304 is a system interface unit 355 for interfacing bus 351 with bus 206, DSP 303, input-output unit 305, and display 306.

Figure 4:
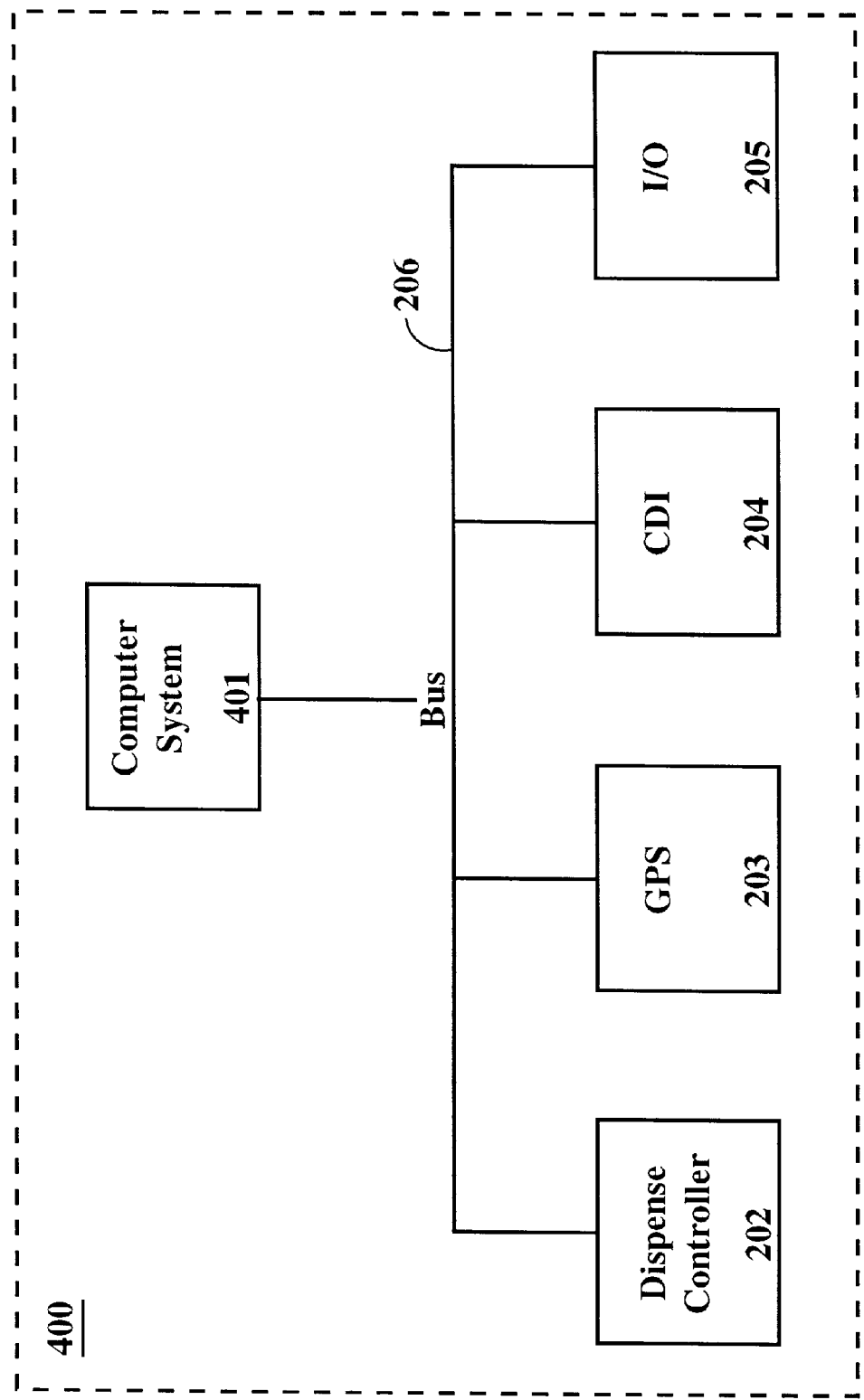
FIG. 4 shows a system in accordance with an alternative embodiment of the present invention.

With reference now to FIG. 4, a system 400 in accordance with one alternative embodiment of the present invention is shown. System 400 is substantially the same as system 200 with the exception of a discreet computer system 401. Computer system 401 is included to provide a separate, discreet computer system platform for the software of the present invention. It should be noted that computer system 401 is substantially similar to embedded computer 304 (e.g., having a RAM and ROM coupled to a CPU via a bus). Computer system 401 is, however, a separate component as opposed to being embedded within one of the other components of the system of the present invention.

Referring now to FIG. 5, a diagram of an aircraft 501 of the present invention and a crop circle 502 is shown. FIG. 5 shows aircraft 501 as it is preparing to enter crop circle 502 and beginning to dispense agricultural chemicals. As described above, system 200, in accordance with one embodiment of the present invention, automatically determines the configuration (e.g., the GPS coordinates) of crop circle 502 and the desired flight path of aircraft 501.

In accordance with the present embodiment, the pilot of aircraft 501 prepares to spray crop circle 502 by lining up with a center point 503 of crop circle 502. The center point 503 is readily identifiable from the air due to the presence of the center pivot of the boom (not shown). The pilot visually lines up on center point 503 in the direction in which the swaths are to be flown (e.g., into the prevailing wind). Each of the subsequent swaths will thus be parallel to the resulting flight path 505. When the pilot crosses the boundary of crop circle 502, he signals system 200 (e.g., by pressing a button on CDI 204 or GPS receiver 203), thereby marking an entry point 504 of crop circle 502. In addition, upon crossing the entry point, aircraft 501 begins dispensing agricultural chemicals, laying down its initial swath.

Figure 6:
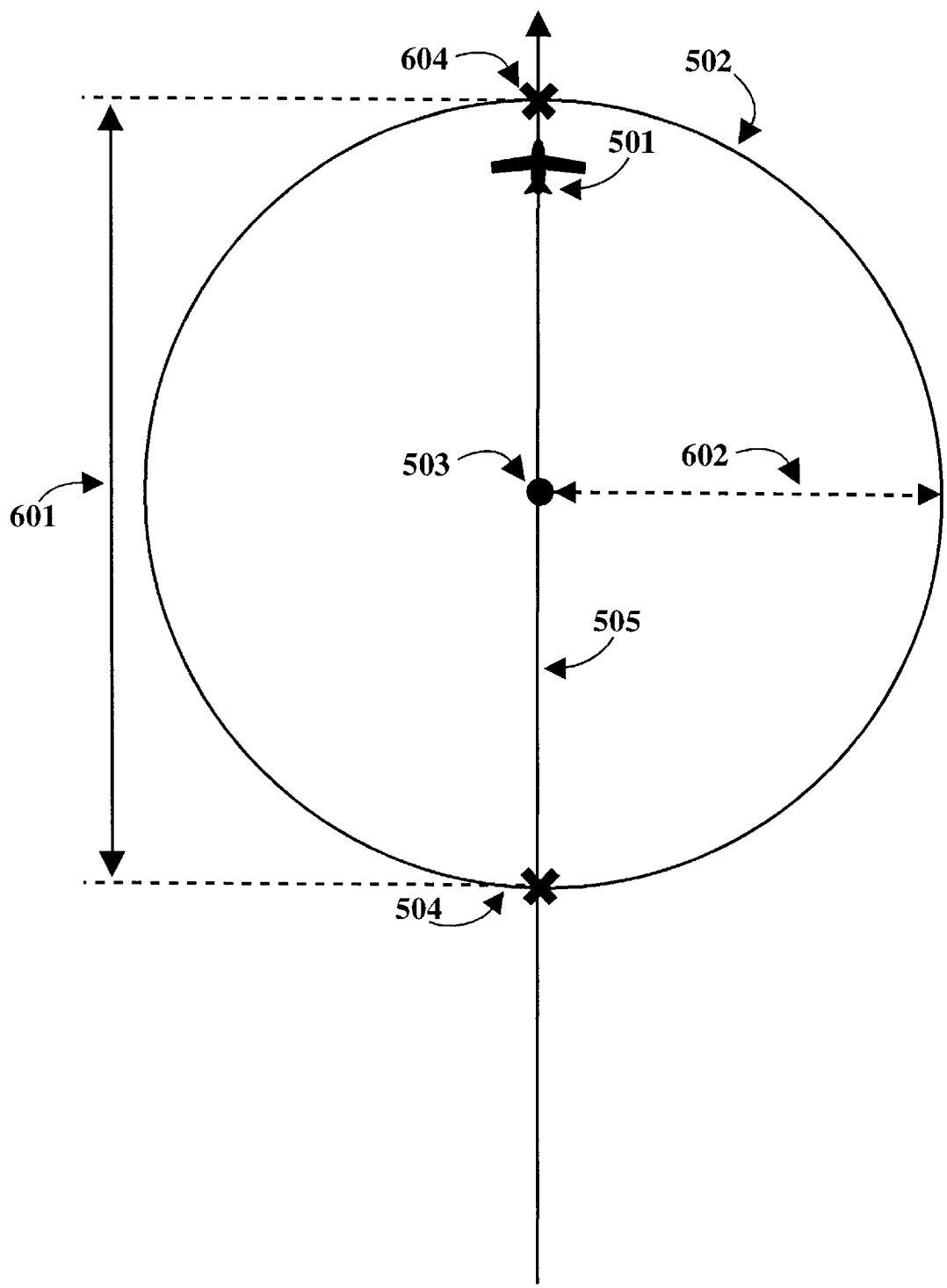
FIG. 6 shows the aircraft after entering the crop circle of FIG. 5 and preparing to exit the crop circle.

FIG. 6 shows aircraft 501 after crossing entry point 504 and approaching an exit point 604. After crossing entry point 504, aircraft 501 continues across center point 503 and toward exit point 604. When the aircraft crosses the boundary and exits crop circle 502, the pilot signals system 200 (e.g., presses a button), thereby marking the exit point 604. In the present embodiment (e.g., system 200 of FIG. 2), once GPS receiver 203 has the entry point 504 and the exit point 604, the configuration of crop circle 502 is automatically determined. GPS receiver 203 tracks the actual flight path 505 and uses the location of entry point 504 and exit point 604 to determine the diameter 601 of crop circle 502, and hence the radius 602 of crop circle 502. Using radius 602, the area of crop circle 502 is computed and the optimal number of swaths and the optimal desired flight path are computed. Thus, since the pilot flies a straight course from entry point 504, across center point 503, to exit point 604, the configuration, the number of swaths, and the desired flight path, are each automatically computed. Upon reaching the exit point, aircraft 501 stops dispensing the agricultural chemicals, completing its initial swath. Additional details regarding the determination of the optimal desired flight path are described in the discussion of FIG. 9 below.

Figure 7A:
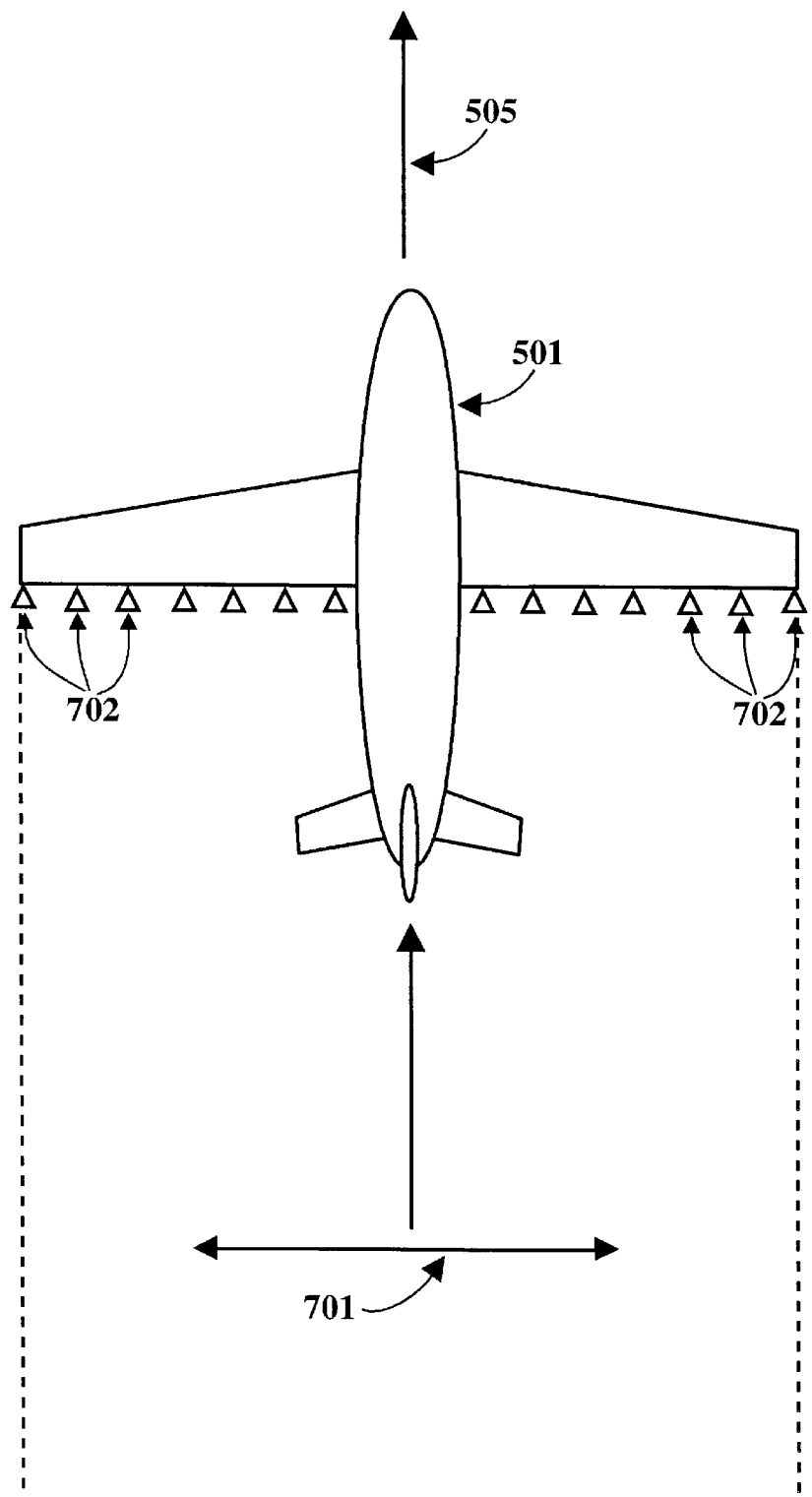
FIG. 7A shows the aircraft and its corresponding swath width.

FIG. 7A shows aircraft 501 and its corresponding swath width 701. Aircraft 501 includes a plurality of chemical dispensing nozzles 702 along the trailing edges of its wings and fuselage. As aircraft 501 flies along its actual flight path 505 and as chemicals are being sprayed from nozzles 702, aircraft 501 lays down a swath of chemicals. As shown in FIG. 7A, the swath width 701 is substantially equal to the span encompassed by the nozzles 702 (e.g., the wing span of aircraft 501). Hence, each swath covers an area equal to the length of the actual flight path across crop circle 502 multiplied by the swath width. This information is programmed into system 200 such that the number of swaths required to cover crop circle 502, the locations of the swaths relative to crop circle 502, and the desired flight plan for most efficiently implementing the swaths can be computed.

Figure 7B:
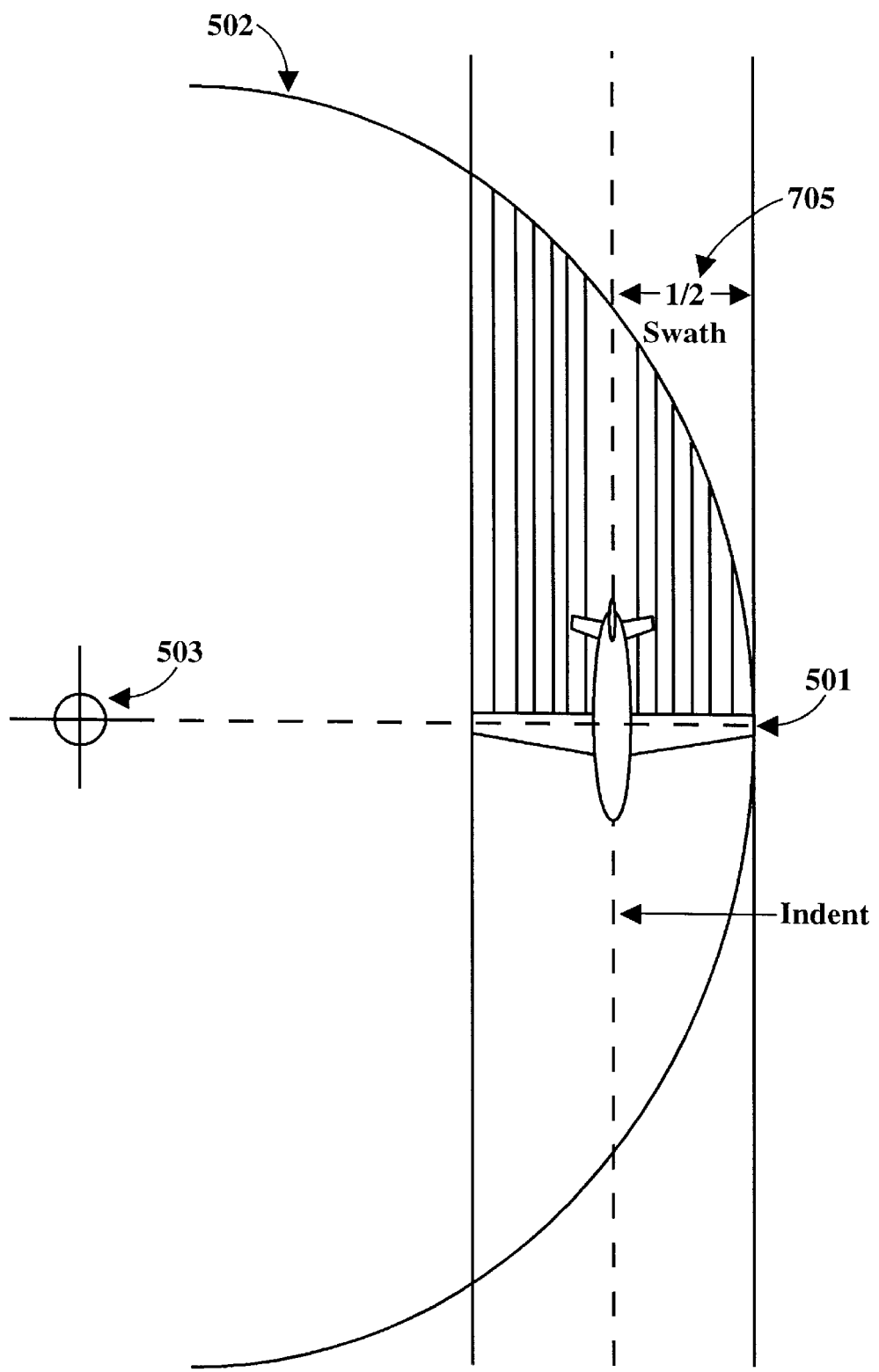
FIG. 7B shows a diagram of the aircraft and a one half swath width indent with respect to the crop circle.

FIG. 7B shows aircraft 501 and its relationship to the edge of crop circle 502. As shown in FIG. 7B, a ½ swath indent 705 can be implemented allowing the wingtip of aircraft 501 to match the boundary of crop circle 502. This reduces, or even eliminates, over-spray outside the boundary of crop circle 502. In this case, system 200, for example, performs the necessary adjustments to the desired flight path such that the wingtip of aircraft 501 matches the boundary as shown.

Figure 8:
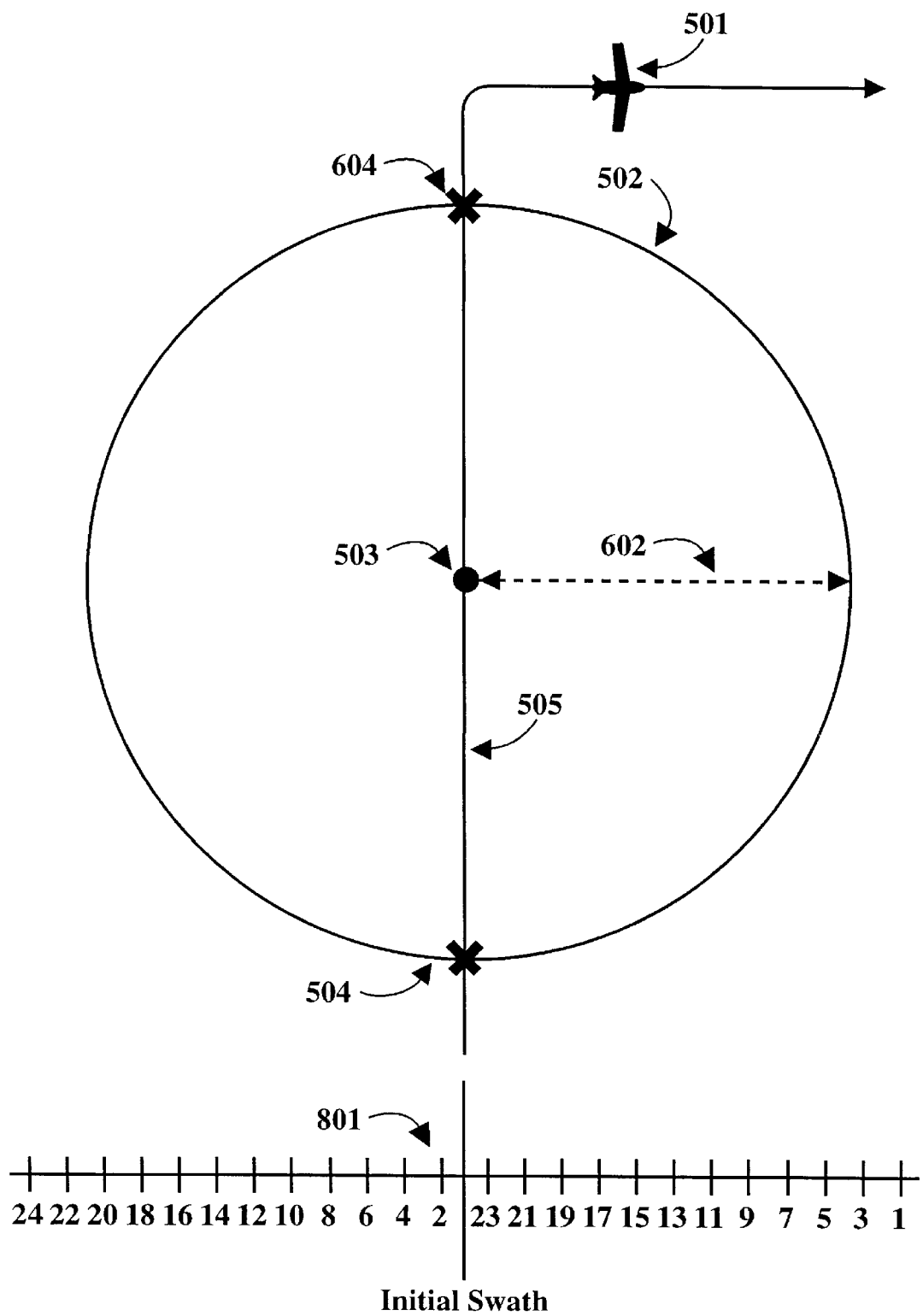
FIG. 8 shows the aircraft after having completed an initial swath of the crop circle of FIG. 5 and after making a right turn.

FIG. 8 shows aircraft 501 after having completed the initial swath and after making a right turn upon reaching the exit point 604. Upon reaching exit point 604, the pilot makes a right turn, guiding aircraft 501 into position for its next swath. As described above, the present invention automatically computes an optimal desired flight path to cover the field. In the present embodiment (e.g., system 200 of FIG. 2), GPS receiver 203 computes a swath pattern 801 which lays out the swaths of the desired flight path. Each successive swath is accordingly numbered (e.g., 1 through 24) with respect to the initial swath such that the desired flight path leads aircraft 501 over crop circle 502 efficiently as it flies each numbered swath in sequence.

It should be noted that since aircraft 501 made a right turn after exit point 604, swath number one is placed on the right edge of crop circle 502 and swath number two is placed just left of the initial swath. If aircraft 501 made a left turn after exit point 604 (e.g., due to winds, obstructions, etc.), swath number one would be placed on the left edge of crop circle 502 and swath two would be just right of the initial swath. In this manner, swath pattern 801 guides aircraft 501 to make successive turns in the same direction as the turn after exit point 604. For example, as shown in FIG. 8, since aircraft 501 made a right turn after exit point 604, each successive swath requires a right turn.

Figure 9:
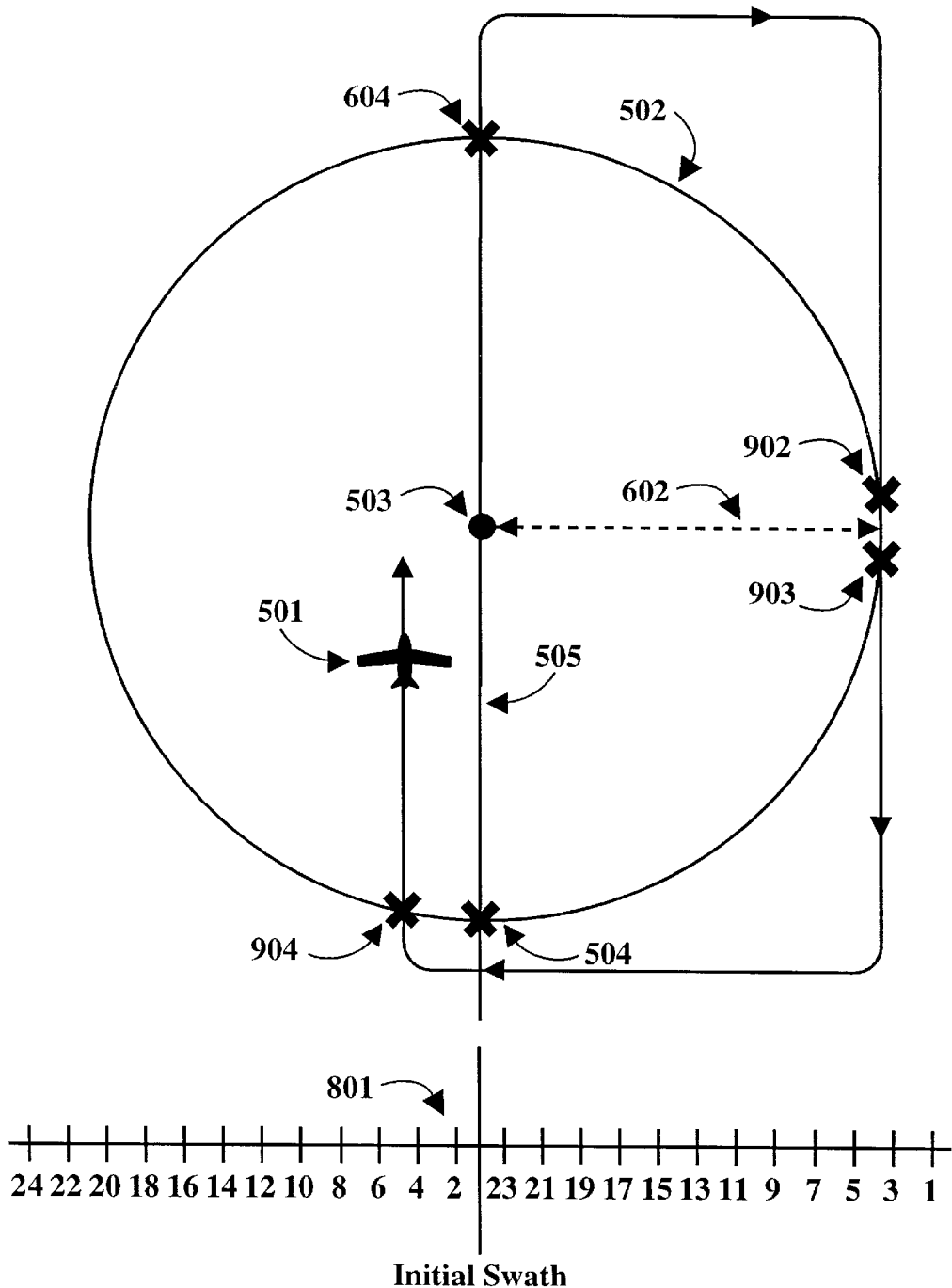
FIG. 9 shows the aircraft flying swath number two after completing swath number one.

FIG. 9 shows aircraft 501 flying swath number two after completing swath number one. As described above, aircraft 501 makes successive right turns to fly each subsequent swath. System 200 indicates when to dispense agricultural chemicals in accordance with the successive entry and exit points. For example, the chemicals are automatically dispensed between points 902 and 903 via the optional dispense controller 202. Alternatively, in embodiments where the optional dispense controller 202 is not included, chemicals are dispensed manually by the pilot in response to an indicator (e.g., a light) on CDI 204. For example, in response to the indicator, the pilot would begin spraying at point 904 as aircraft 501 begins swath two.

Thus, in the manner shown in FIG. 9, the pilot guides aircraft 501 along the desired flight path. In the present embodiment, agricultural chemicals are dispensed in accordance with the dispense signal from dispense controller 202, thereby laying down the 24 swaths of swath pattern 801 across crop circle 502 without gapping the swaths or overlapping the swaths. The desired flight path of the present invention makes efficient use of flight time and agricultural chemicals, allowing aircraft 501 efficiently to cover crop circle 502 in a minimum amount of time.

As described above, the GPS coordinates of entry point 504 and exit point 604 enable the present invention to determine diameter 601 and radius 602 with respect to these GPS coordinates. From this information, everything which needed to compute the optimum flight path for the particular crop circle is known. An algorithm (e.g., executing on embedded computer 304) immediately defines the GPS coordinates for the boundaries of crop circle 502. The algorithm uses the above measured information to determine the GPS coordinates of the starting points and ending points of each successive swath (e.g., swath 2), which are subsequently used to provide steering to the pilot.

For example, in the present embodiment, entry point 504 and exit point 604 are both defined with respect to GPS coordinates x and y. This information is used to likewise define the following:

Entry point $504 = P_1 = x_1 y$
Exit point $604 = P_2 = x_2 y_2$
Diameter $601 =$ $$D_0 = \sqrt{(x_2 - x_1)^2 + (y_2 - y_1)^2}$$

Radius $602 = D_0/2$ $$\text{Thus, the center of crop circle} = \left(\frac{P_2 - P_1}{2}\right) = P_0,$$

where $P_0 = x_0 y_0$ and where $$x_0 = \frac{x_1 + x_2}{2} \text{ and } y_0 = \frac{y_1 + y_2}{2}$$

Thus, for each swath width sw, the number of swaths required to completely cover a crop circle is:

$$\frac{D_0}{sw}$$

and for a given particular swath x:

$$x_i = x_0 + sw(i)$$

where i is an integer swath corresponding to the number of swaths left (−) or right (+) of the initial swath. For example, referring still to FIG. 9, for swath number 2 (the swath being flown by aircraft 501 as shown in FIG. 9), i=−1, and for swath number 3, i=+11. Thus, each successive swath i, there is an entry point $x_i, y_{1i}$, and an exit point $x_i, y_{2i}$ where:

$$y_i = \sqrt{\left(\frac{D_0}{2}\right)^2 - (x_0 + sw(i))^2}$$

$$y_{i1} = y_0 - y_i$$

$$y_{i2} = y_0 + y_i$$

The above equations, in accordance with the present embodiment, comprise defining the configuration of the crop circle and determining the desired flight path.

The above equations depict one method of defining the configuration of the crop circle. As such, it should be appreciated that other mathematical algorithms can be employed to define the crop circle and determine the desired flight path while remaining within the scope of the present invention. In addition, the equations as shown above are base upon whole swath widths. However, it should be appreciated that fractional swath widths (e.g., ½ swath widths) can also be used to define the configuration and determine the desired flight path, as shown in FIG. 7B.

FIG. 10 shows a flow chart of the steps of a process 1000 in accordance with one embodiment of the present invention. Process 1000 is the operating process of an aircraft (e.g., aircraft 501) dusting a crop circle (e.g., crop circle 502) using a system (e.g., system 200) in accordance with one embodiment of the present invention. It should be noted that process 1000 depicts the operation of a system which includes an optional dispense controller (e.g., dispense controller 202) and optional I/O component (e.g., I/O component 205).

In step 1001, a crop dusting aircraft (e.g., aircraft 501) equipped with the present invention begins an initial swath on a crop circle. As described above, the pilot lines up on the center pivot of the crop circle in the direction in which the swaths are to be flown. This direction can be dictated by a number of factors, including wind direction, obstructions, neighboring fields, and the like, and is not limited by any requirements of the system of the present invention. As the pilot crosses the initial entry point of the crop circle, he asserts an entry point signal (e.g., presses a button) to store the entry point into system 200 and to begin dispensing chemicals.

In step 1002, the aircraft completes the initial swath. When the aircraft exits the crop circle, the pilot asserts an exit point signal to store the exit point and to stop dispensing chemicals. As described above, the initial swath is flown in a straight line from the entry point, across the center pivot, to the exit point.

In step 1003, the system of the present invention determines the dimensions of the crop circle. As described above, using the entry point and exit point information, system 200 is able to compute the dimensions of the crop circle. A GPS receiver (e.g., GPS receiver 203) included within system 200 measures the distance between the initial entry point and the initial exit point, and uses this distance as the diameter of the crop circle. From the diameter, the radius, and hence, the total area and GPS coordinates of the crop circle, including its boundaries, are computed. As described above, the implementing software for these computations can be hosted on any appropriate computer system platform, such as, for example, on an embedded computer (e.g., embedded computer 304) within the GPS receiver, or on a separate, computer system component (e.g., computer system 401 of system 400). Depending upon whether the pilot makes a left or right turn after the initial exit point, the process of the present invention proceeds to step 1004 or to step 1010.

In step 1004, where the pilot makes a left turn after the initial exit point, the system of the present invention determines a left-turning desired flight path wherein each turn in flying the subsequent swaths is a left turn. As described above, a swath pattern (e.g., swath pattern 801) is determined such that each successive swath is accordingly numbered to lead the aircraft over the crop circle efficiently as it flies each numbered swath in sequence.

In step 1005, the aircraft flies the subsequent swath of the swath pattern. The system of the present invention provides guidance to the pilot, enabling the pilot to maintain the desired flight path. In the present embodiment (e.g., system 200), the optional dispense controller generates a dispense signal which automatically dispenses chemicals at the proper times (e.g., from each successive entry to exit).

In step 1006, the coverage status of the crop circle is updated. As described above, each swath that the aircraft flies covers a corresponding swath area. As the swaths are completed, the system of the present invention updates the area (e.g., square yards) remaining to be sprayed, the area of the crop circle already covered, and other relevant information (e.g., wind direction, etc.).

In step 1007, the process continues, with each successive swath, until the crop circle is completely covered. If there are remaining swaths to fly, the process of the present invention proceeds back to step 1005 to fly the subsequent swath. If the crop circle is covered, the process proceeds to step 1008.

In step 1008, the coverage data for the crop circle is stored. This information includes, for example, the final statistics for the amount of chemicals dispensed, the area to which the chemicals were dispensed, the degree to which the aircraft maintained its desired course, and the like. The information is printed or otherwise outputted via the optional I/O component (e.g., I/O component 205). The process of the present invention subsequently ends in step 1009.

Figure 10A:
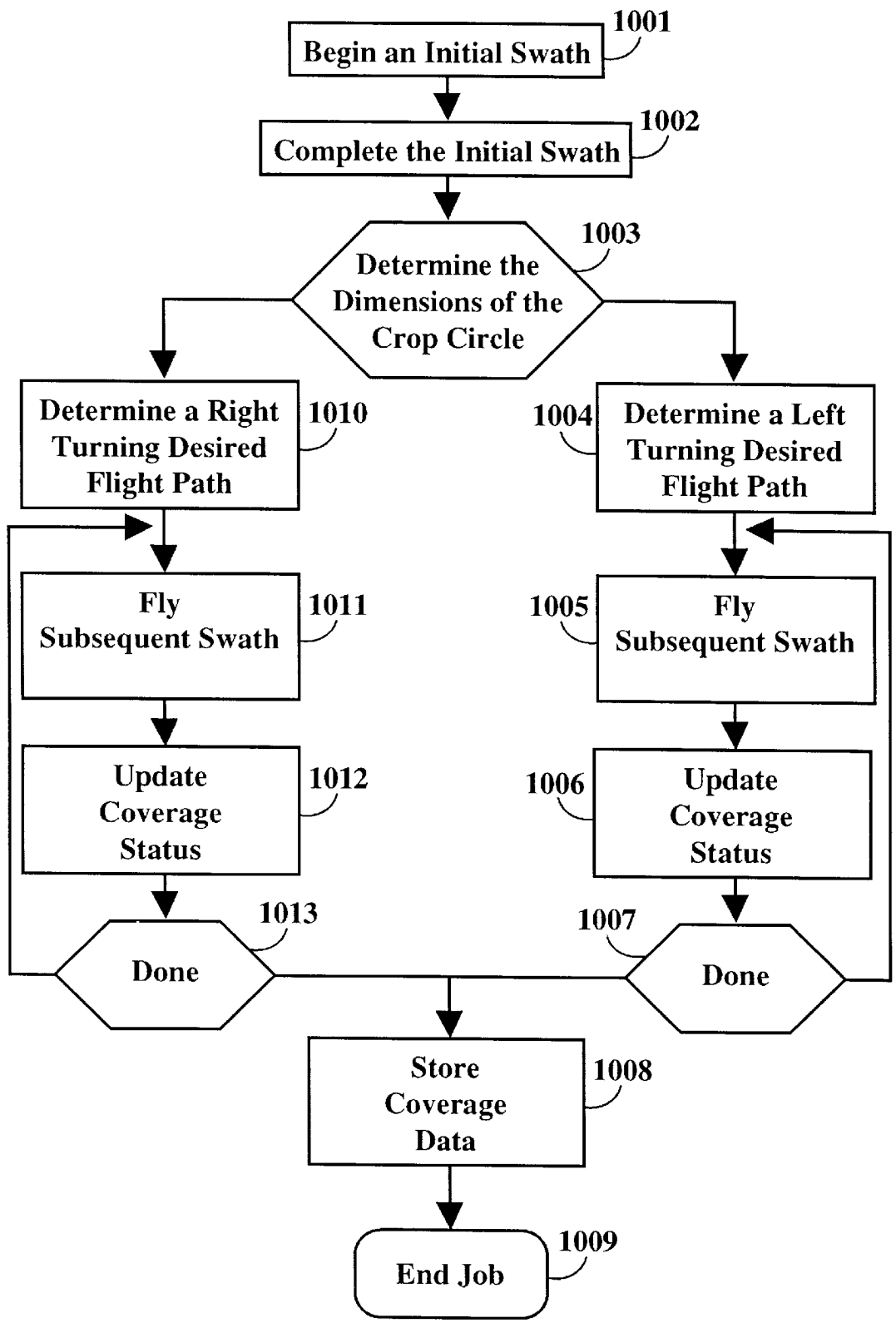
FIG. 10A shows a flow chart of the steps of a process in accordance with one embodiment of the present invention.

Referring still to FIG. 10A, in step 1003, where the pilot makes a right turn after the initial exit point (e.g., as shown in FIG. 8), the process of the present invention proceeds through steps 1010 through 1013. Steps 1010 through 1013 are substantially similar to steps 1004 through 1006 except for the fact that each of the turns are right turns.

In step 1010, where the pilot makes a right turn after the initial exit point, a right-turning desired flight path and swath pattern, wherein each of the turns in flying the subsequent swaths are right turns, are determined.

In step 1011, the aircraft flies the subsequent swath of the swath pattern. Guidance is provided to the pilot, enabling the pilot to maintain the desired flight path. The optional dispense controller generates a dispense signal which automatically dispenses chemicals at the proper times (e.g., from each successive entry to exit).

In step 1012, the coverage status of the crop circle is updated. As the swaths are completed, the system of the present invention updates the area remaining to be sprayed, the area of the crop circle already covered, and other relevant information. From step 1012, the process of the present invention proceeds to step 1013 and either continues to steps 1008 and 1009 if the field is completed, or back to step 1011 to fly the subsequent swath.

Figure 10B:
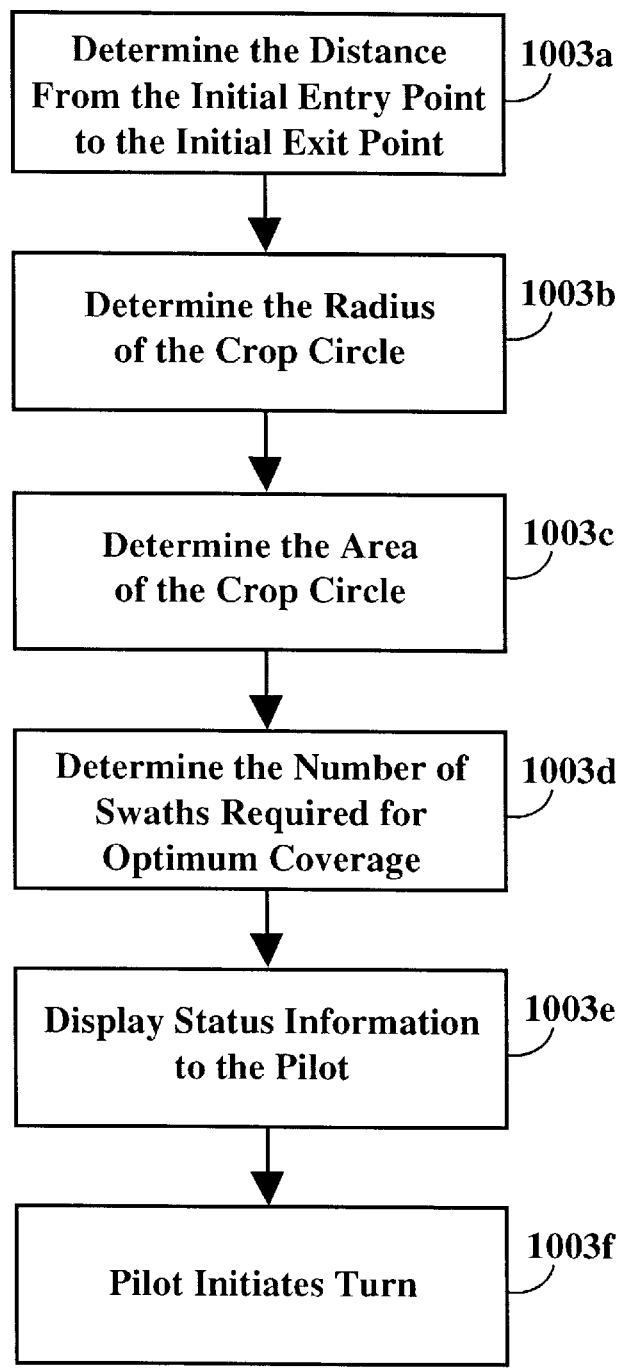
FIG. 10B shows additional steps of the process of FIG. 10A.

Referring now to FIG. 10B, the steps of a process which comprises step 1003 of FIG. 10A are shown. As described above in step 1003, the system of the present invention determines the dimensions of the crop circle. Steps 1003a–1003f show this step in greater detail.

In step 1003a, as described above, in one embodiment of the present invention (e.g., system 200), GPS receiver 203 determines the distance from the initial entry point to the initial exit point. The pilot flies the initial swath in a straight line across the center pivot of the crop circle.

In step 1003b, the distance between the initial entry and exit points is halved to obtain the radius of the crop circle.

In step 1003c, the radius is used to determine the area and the boundaries of the crop circle.

In step 1003d, the number of swaths required for optimum coverage of the crop circle is computed. As described above, the swath width of the aircraft determines the area covered during each swath (e.g., as shown in FIG. 7A). This in turn, allows the present invention to compute the number of swaths required for covering the crop circle.

In step 1003e, the above information is displayed to the pilot. This information includes total area of the crop circle, the number of required swaths, the dimensions of the crop circle, and any other relevant information.

In step 1003f, the pilot initiates either a left or right turn, as described above, the process of the present invention returns to either step 1004 or step 1010 of FIG. 10A.

Figure 10C:
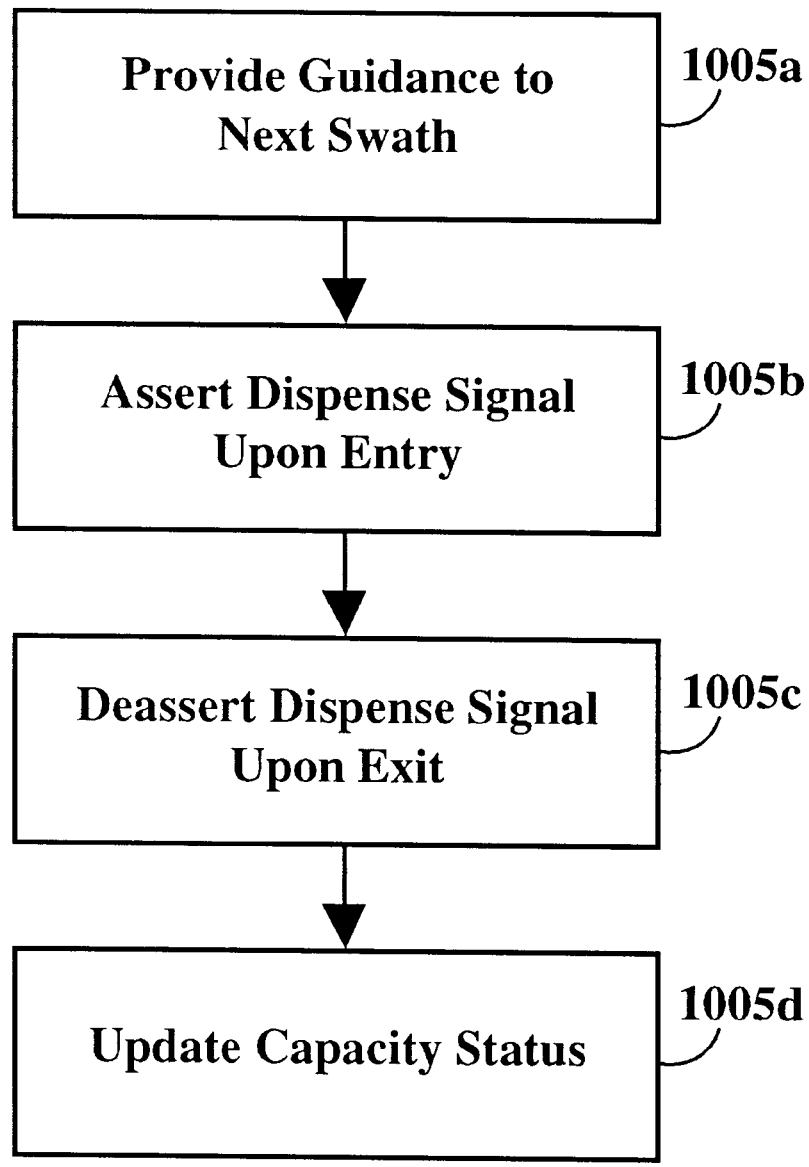
FIG. 10C shows more additional steps of the process of FIG. 10A.

Referring now to FIG. 10C, the steps of a process which comprises step 1005 of FIG. 10A are shown. As described above in step 1005, the system of the present invention determines a left turning desired flight path. Steps 1005a–1005d show this step in greater detail.

In step 1005a, the system of the present invention (e.g., system 200) provides guidance to the pilot to the next swath. A CDI (e.g., CDI 204) provides course guidance to the pilot to enable navigation along the desired flight path. This information includes for example, desired ground track, track angle error, and the like.

In step 1005b, the dispense controller automatically asserts a dispense signal upon entry into the crop circle. As the aircraft crosses the boundary, as determined via GPS receiver 203, the dispense signal is asserted, which in turn, sprays the chemicals.

In step 1005c, the dispense controller deasserts the dispense signal upon exit from the crop circle. This shuts off the chemical spraying.

In step 1005d, having completed the swath, the capacity of the chemical tanks, which store the agricultural chemicals aboard the aircraft, is updated and displayed to the pilot. The process of the present invention returns to step 1006. As described above, steps 1010–1012 of FIG. 10A are similar to steps 1004–1007. Hence, it should be appreciated that step 1011 further includes steps similar to steps 1005a–1005d of FIG. 10C.

Thus, the present invention provides a method and system which specifically accounts for the form factor of a crop circle. The system of the present invention gives the pilot of a crop-dusting aircraft a precise point of entry onto the crop circle, and which positions the point of entry such that the pilot has an unmistakable visual reference (e.g., the center pivot of the crop circle). The system of the present invention provides accurate guidance commands such that the entire crop circle can be covered without any gaps or overlaps, and without requiring the crop dusting aircraft to fly through its own spray. In addition, the system of the present invention makes efficient use of aircraft flight time by covering the crop circle in a minimum amount of time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A GPS aircraft guidance system for use with circular cultivated agriculture fields, comprising:

a GPS receiver adapted to determine a position of an aircraft, said GPS receiver adapted to store coordinates of a circular cultivated agricultural field, said GPS receiver adapted to determine a desired flight path for achieving a coverage of said circular cultivated agricultural field, said GPS receiver adapted to determine a deviation of said aircraft from said desired flight path, said GPS receiver further adapted to generate a dispense signal which indicates when to dispense agricultural chemicals from said aircraft; and a guidance indicator coupled to said GPS receiver, said guidance indicator adapted to indicate said deviation to a pilot of said aircraft to aid said pilot in maintaining said desired flight path and achieving said coverage;

said GPS receiver adapted to determine said coordinates of said circular cultivated agricultural field by receiving a first signal from said pilot when said aircraft crosses an entry point of said circular cultivated agricultural field and receiving a second signal from said pilot when said aircraft crosses an exit point of said circular cultivated agricultural field, wherein said aircraft crosses a center pivot of said circular cultivated agricultural field.

2. The system of claim 1 wherein said GPS receiver determines said coordinates by measuring a distance flown between an assertion of said first signal and an assertion of said second signal.

3. The system of claim 1 wherein said GPS receiver is further adapted to determine said desired course wherein said aircraft dispenses said agricultural chemicals in a series of parallel swaths across said field, without gapping said swaths or overlapping said swaths, by following said desired course.

4. The system of claim 1 wherein said GPS receiver is further adapted to determine said desired course wherein said aircraft dispenses said agricultural chemicals in a series of parallel swaths across said field, without causing said aircraft to fly through said chemicals from a previous swath, by following said desired course.

5. The system of claim 1 wherein said guidance indicator comprises a CDI (course deviation indicator).

6. The system of claim 1 further including a dispense controller coupled to receive said dispense signal, said dispense controller adapted to automatically control dispensing of said chemicals from said aircraft in response to said dispense signal.

7. The system of claim 1 wherein said GPS receiver is a differential GPS receiver.

8. The system of claim 1 wherein said GPS receiver includes an embedded computer having a central processing unit coupled to a memory, and wherein said memory includes software which when executed on said central processing unit cause said GPS receiver to determine said desired flight path.

9. A GPS aircraft guidance system for use with circular cultivated agriculture fields, comprising:

a guidance indicator adapted to indicate a deviation to a pilot of an aircraft to aid said pilot in maintaining a desired flight path; and a GPS receiver adapted to determine a position of said aircraft;

a computer system coupled to said GPS receiver and said guidance indicator, said computer system having a central processing unit coupled to a memory, wherein said memory stores software which when executed on said central processing unit causes said computer system to implement a method comprising the steps of:

storing coordinates of a circular cultivated agricultural field;

determining said desired flight path for achieving a coverage of said circular cultivated agricultural field;

determining a deviation of said aircraft from said desired flight path; and generating a dispense signal which indicates when to dispense agricultural chemicals from said aircraft, wherein said computer system determines said coordinates by receiving a first signal from said pilot when said aircraft crosses an entry point of said circular cultivated agricultural field and receiving a second signal from said pilot when said aircraft crosses an exit point of said circular cultivated agricultural field, wherein said pilot flies across a center pivot of said circular cultivated agricultural field.

10. The system of claim 9 wherein said computer system determines said dimensions by measuring a distance flown between an assertion of said first signal and an assertion of said second signal.

11. The system of claim 9 wherein said computer system determines said desired course wherein said aircraft dispenses said agricultural chemicals in a series of parallel swaths across said field, without gapping said swaths or overlapping said swaths.

12. The system of claim 9 wherein said computer system determines said desired course wherein said aircraft dispenses said agricultural chemicals in a series of parallel swaths across said field without causing said aircraft to fly through said chemicals from a previous swath.

13. The system of claim 9 wherein said GPS receiver is a differential GPS receiver.

14. The system of claim 9 further including a dispense controller coupled to receive said dispense signal, said dispense controller adapted to automatically control dispensing of said chemicals from said aircraft in response to said dispense signal.

15. The system of claim 9 further including an input output component coupled to said computer system, said input output component adapted to provide information from said computer system to an external component.

16. The system of claim 9 wherein said computer system is embedded within said GPS receiver.

17. A method for guiding an aircraft and implementing efficient dispensing of agricultural chemicals on a circular cultivated agricultural field, the method comprising the steps of:

a) determining a position of an aircraft using a GPS receiver;

b) determining coordinates of a circular cultivated agricultural field by receiving a first signal from said pilot when said aircraft crosses an entry point of said circular cultivated agricultural field and receiving a second signal from said pilot when said aircraft crosses an exit point of said circular cultivated agricultural field, wherein said aircraft crosses a center pivot of said circular cultivated agricultural field;

c) determining a desired flight path for achieving a coverage of said circular cultivated agricultural field;

d) determining a deviation of said aircraft from said desired flight path;

e) generating a dispense signal which indicates when to dispense agricultural chemicals from said aircraft; and f) indicating said deviation to a pilot of said aircraft to aid said pilot in maintaining said desired flight path and achieving said optimal coverage.

18. The method of claim 17 wherein step b) further includes measuring a distance flown between an assertion of said first signal and an assertion of said second signal to determine said coordinates, wherein said distance is a diameter of said circular cultivated agricultural field.

19. The method of claim 17 wherein step c) further includes determining said desired course wherein said aircraft dispenses said agricultural chemicals in a series of parallel swaths across said field, without gapping said swaths or overlapping said swaths.

20. The method of claim 17 wherein step c) further includes determining said desired course wherein said aircraft dispenses said agricultural chemicals in a series of parallel swaths across said field without causing said aircraft to fly through said chemicals from a previous swath.

21. The method of claim 17 wherein step f) further includes indicating said deviation by using a CDI (course deviation indicator).

22. The method of claim 17 wherein step f) further including dispensing said agricultural chemicals automatically in response to said dispense signal.

23. The method of claim 17 wherein said GPS receiver is a differential GPS receiver.

24. The method of claim 17 wherein said GPS receiver is an RTK (real time kinematics) GPS receiver.

25. A DGPS aircraft guidance system for use with circular cultivated agriculture fields, comprising:

a guidance indicator adapted to indicate a deviation to a pilot of an aircraft to aid said pilot in maintaining a desired flight path; and a DGPS receiver adapted to determine a position of said aircraft;

a computer system coupled to said DGPS receiver and said guidance indicator, said computer system having a central processing unit coupled to a memory, wherein said memory stores software which when executed on said central processing unit causes said computer system to implement a method comprising the steps of:

a) determining a position of an aircraft using said DGPS receiver;

b) automatically resolving coordinates of said field using said aircraft flying from an entry point of said field across a center point of said field;

c) storing said coordinates of said field;

d) determining a desired flight path for achieving a coverage of said field using said coordinates;

e) determining a deviation of said aircraft from said desired flight path;

f) generating a dispense signal which indicates when to dispense agricultural chemicals from said aircraft; and g) indicating said deviation to a pilot of said aircraft to aid said pilot in maintaining said desired flight path and achieving said optimal coverage.

26. The system of claim 25 wherein said computer system automatically resolves said coordinates of said circular cultivated agricultural field by receiving a first signal from said pilot when said aircraft crosses said entry point of said field and receiving a second signal from said pilot when said aircraft crosses said center point of said field.

27. The system of claim 25 further including a dispense controller coupled to receive said dispense signal, said dispense controller adapted to automatically control dispensing of said chemicals from said aircraft in response to said dispense signal.

28. The system of claim 25 wherein said computer system is embedded within said DGPS receiver.

29. The method of claim 25 wherein said DGPS receiver is an RTK (real time kinematics) DGPS receiver.

* * * * *